Sept. 23, 1952 G. P. NEEDY 2,611,607
ADJUSTABLE ACCORDION AIR CUSHION SPRINGS
Filed Oct. 22, 1948 2 SHEETS—SHEET 2
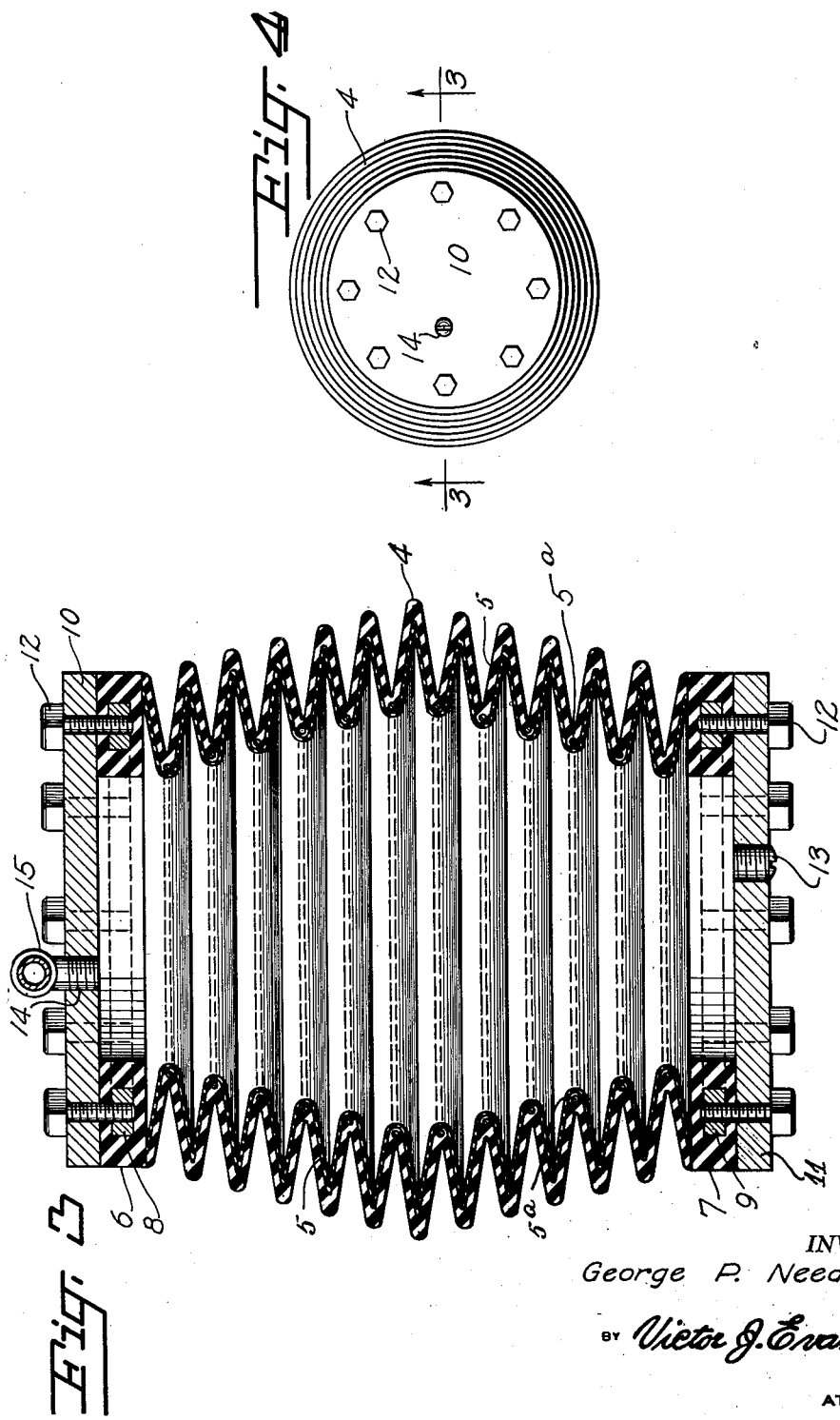
INVENTOR.
George P. Needy
BY Victor J. Evans & Co.
ATTORNEYS Patented Sept. 23, 1952

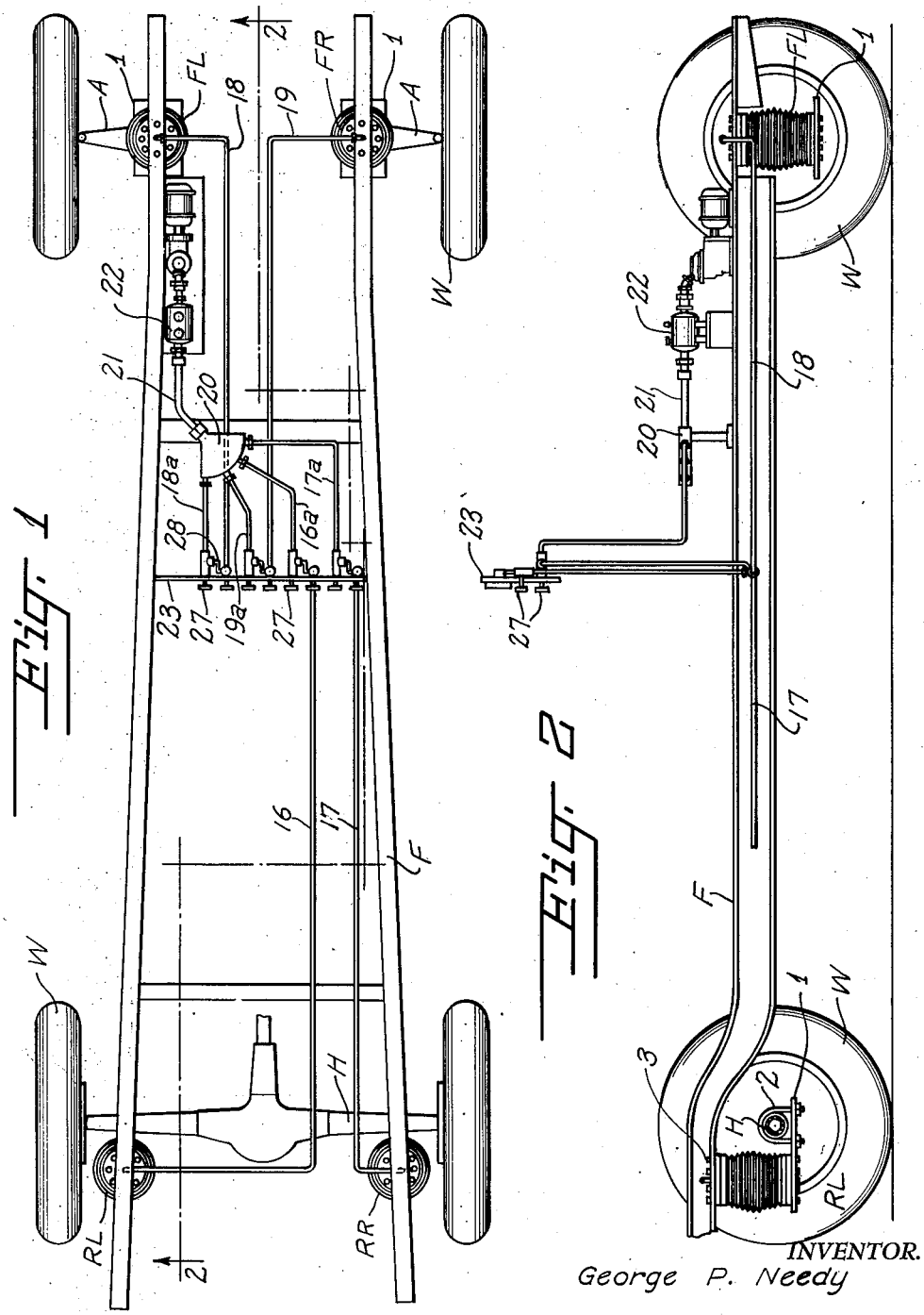

2,611,607

UNITED STATES PATENT OFFICE 2,611,607

ADJUSTABLE ACCORDION AIR CUSHION SPRING

George Price Needy, Inkster, Mich.

Application October 22, 1948, Serial No. 55,948

1 Claim. (Cl. 267—65)

My present invention relates to the general class of deformable fluid pressure, or pneumatic spring devices for use with automotive vehicles of various types, and more specifically to an improved spring suspension including adjustable accordion air cushion springs for supporting and suspending with a cushioning effect the load of a vehicle and thereby absorb imposed strains and stresses to insure smooth traveling and easy riding for the occupants of the vehicle.

In carrying out my invention, a four-wheel automotive vehicle of selected type for example, may be equipped with four pneumatic spring suspension units of the bellows or accordion pleated type that are supplied with air under pressure from a motor-operated compressor, and the pneumatic system including these units is provided with complementary pressure gauges, and manually operated control valves and release valves for manipulation by a driver of the vehicle are utilized to properly maintain a uniform pressure throughout the pneumatic system for effective use of the suspension units.

The equipment involved in the utilization of my invention includes a minimum number of standardized parts that may be manufactured with facility and low cost of production, and the parts may be assembled, and installed with convenience and a minimum expenditure of time and labor, as component parts of standard automobiles.

The invention consists in certain novel features of construction and combinations and arrangements of parts as will hereinafter be described in detail and more particularly pointed out in the appended claim. In the accompanying drawings I have illustrated a complete example of a physical embodiment of my invention as a component part of an automotive vehicle, in which the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of the invention.

Figure 1 is a plan view showing so much of a vehicle chassis as is necessary to illustrate the installation of my pneumatic spring suspension system; and Figure 2 is a vertical longitudinal sectional view at line 2—2 of Fig. 1.

Figure 3 is an enlarged vertical sectional detail view of one of the pneumatic spring devices, as at line 3—3 of Fig. 4; and Figure 4 is a top plan view of this device.

In order that the general arrangement and utility of parts may readily be understood I have shown in Figs. 1 and 2, portions of an automotive vehicle including the chassis or main frame F, the four wheels W, the rear axle housing H, and the front axle parts A, that are utilized in the installation of the spring suspension of my invention. The vehicle is equipped with four similar pneumatic springs or the deformable or bellows type that are each designated as a unit by the letters FL and FR for the front wheels, and RL and RR for the rear wheels, for cushioning, suspending, and supporting the load of the vehicle. Each of these four units is mounted in the frame in upright position between the supporting axle parts and the relatively movable frame portion by means of a base plate 1 that is secured to an axle part by means of U-bolts 2, or in other suitable manner, and the upper ends or heads of the pneumatic units are secured as by bolts or screws 3 to the frame F of the vehicle.

In the enlarged Figures 3 and 4 of the drawings, one of these pneumatic cushioning units is shown in detail, and inasmuch as they are of similar construction and operation, a description of one unit will suffice for all of the units. In its preferred form the pneumatic spring includes a barrel shaped casing 4 fashioned with bellows-like or accordion-shaped pleats, and made up of flexible and resilient material, as rubber, with cord reinforcements similar to the construction of vehicle wheel tires of the pneumatic type, and adapted to different formations with varying degrees of air pressure within the casing. The casing 4 has an inner lining 5 of rubber. Steel wire rings 5a are embedded in the inner tips of the casing 4 to prevent the casing from spreading and stretching radially.

The casing terminates in upper and lower rings or annular shoes 6 and 7, respectively, in which is embedded and vulcanized a steel attaching ring as 8 and 9, each provided with a series of bolt holes. The upper end of the casing is closed and sealed by a metal head plate 10, and its lower end is sealed and closed by a bottom plate 11, screws 12 being employed for fastening these end plates to the rings 8 and 9, and these plates may be utilized in anchoring the upper end of casing to the frame of the vehicle and the lower end of the casing to the axle housings, to enable the pneumatic springs to properly function.

The bottom plate 11 is provided with a drain opening that is normally closed by means of a screw plug 13 threaded therein.

For supplying air under pressure to the interior of the casing, the head plate is drilled with an air port 14 and attaching nipple 15 for connection with the pneumatic system; and each of the two rear units are supplied with air under pressure through pipes 16 and 17, while the two front units are supplied with air under pressure through pipes 18 and 19.

Each of these supply pipes 16, 17, 18, 19 is connected with a complementary distributing pipe designated as 16a, 17a, 18a, and 19a, and the latter pipes project from a four-day distributer or tubular fitting 20 which receives the compressed air from the outlet pipe 21 of an air reservoir or tank 22, as best seen in Fig. 1.

The connections between the distributing pipes and their complementary supply pipes to the pneumatic springs are made at a transversely arranged and vertically disposed instrument board or other support as 23, and the flow of air under pressure is governed and regulated by means of four manually operated control valves of similar construction and operation, which are mounted upon the support 23.

When installing the pneumatic spring suspension system as a part of an automotive vehicle, these standardized parts may readily be adapted and adjusted to existing conditions and mounted on desirable supporting parts of the vehicles of different types, and the electric motor with its controls will be included in the electrical system of the equipped automobile. With a minimum expenditure of time and expert labor the various devices and appliances may be mounted, and due to the simplified construction and arrangement of the system repairs and replacements may readily be made to maintain the system in excellent working condition.

Having thus fully described my invention, what I claim as new and desire to secure by Letters Patent is:

A deformable pneumatic spring for use in the suspension system of an automotive vehicle including a barrel-shaped flexible casing provided with a plurality of horizontally disposed bellows-like pleats, a resilient lining arranged within said casing and having the same configuration as the latter, a plurality of wire rings embedded in said casing for preventing the casing from spreading and stretching radially, said casing having its lower and upper ends each terminating in an annular shoe, a steel ring embedded in each of said shoes, a head plate arranged contiguous to the upper end of said casing, means passing through the head plate and the shoe adjacent thereto and into the adjacent ring for securing the head plate to the adjacent shoe, a bottom plate arranged contiguous to the lower end of said casing, means passing through the bottom plate, and the shoe adjacent thereto and into the other of said rings for securing the bottom plate to the adjacent shoe, a drainage opening in said bottom plate, a screw plug normally closing said drainage opening, an air port in said head plate and a nozzle arranged in engagement with said air port.

GEORGE PRICE NEEDY.

REFERENCES CITED

The following references are of record in the file of this patent:

UNITED STATES PATENTS

| Number | Name | Date |
|---|---|---|
| 1,111,739 | Davis | Sept. 29, 1914 |
| 1,555,199 | Gouirand | Sept. 29, 1925 |
| 1,579,184 | Weiland | Mar. 30, 1926 |
| 2,017,419 | Mercier | Oct. 15, 1935 |
| 2,115,072 | Hunt | Apr. 26, 1938 |
| 2,257,913 | Maranville | Oct. 7, 1941 |

FOREIGN PATENTS

| Number | Country | Date |
|---|---|---|
| 317,231 | Italy | Apr. 30, 1934 |